UNITED STATES PATENT OFFICE 2,660,543

FLAMEPROOFING POLYMERS

George E. Walter, Baltimore, Irwin Hornstein, East Riverdale, and Clarence A. Sheld, Baltimore, Md., assignors to The Glenn L. Martin Company, Middle River, Md., a corporation of Maryland No Drawing. Application November 26, 1948, Serial No. 62,236

6 Claims. (Cl. 117—136)

The invention relates to the preparation of organic compounds for flameproofing natural and synthetic organic materials of all kinds, including materials derived from cellulose and cellulose esters, such as fibers and fabrics from cotton, cellulose acetate, etc. The invention is also applicable to the flameproofing of wood.

In general, there are two ways of flameproofing textiles. One consists in the application of a solution of a soluble flameproofer, in most cases an ammonium salt, for instance, ammonium phosphate and ammonium sulfamate. While this method will not greatly alter the feel and color of the textile, it will lead to a soluble non-permanent finish. Furthermore, crystallisation and some decomposition of the ammonium salt on aging may impair the feel and the tensile strength of the material.

The second way consists in the application of a mixture of an insoluble inorganic pigment, especially antimony oxide, with a resinous binder, especially chlorinated paraffins or vinylite resins, to make the flameproofing agents adhere to the cloth. Though this way will lead to a permanent treatment, it will alter the "feel" (hand) and the color of the cloth appreciably.

We have found a method of effectively flameproofing textiles of all kinds, including natural and artificial fibers, by using a new class of flameproofers, i. e., by polymerizing organic non-ionic flameproofing compounds which upon polymerization will furnish their own resinous binder so that no foreign resinous binder will be necessary. Finishes imparting permanence to laundering and dry-cleaning of the treated textile, but not affecting its "feel" (hand) can be achieved with this process as will be pointed out below.

The compounds and their preparation are described in the copending patent application of George E. Walter and Irwin Hornstein, Serial No. 62,232, filed November 26, 1948.

To date, whenever polymers have been employed in the flameproofing field, they were flameproofing compositions rather than flameproofing compounds. In these, the resin formed a part, as a binder, of a phosphate or other salts or salt-like compounds, or as a component of them. Whether those compounds were ammonium salts, amine-type salts, certain organic oxides, or polymers with which phosphoric acid was combined in salt form, all of these compounds were of a heteropolar ionic nature demonstrating a degree of instability which usually caused deterioration of the fabric and/or lack of permanence. It is the main object of this invention to apply homopolar non-ionic type organic compounds on the material to be flameproofed to avoid the above defects.

Thus, one object of the invention is the application of a polymerizable organic flameproofing agent which upon polymerization will provide its own resinous binder.

Another object of the invention is the polymerization of organic phosphorus compounds containing at least one active double bond and at least one halogen atom in the molecule before or after application to the inflammable material, particularly to fibers and textiles of all kinds.

Another object is the bromination of alkene phosphates before or after polymerization and their application on textiles. The alkene phosphates may also be referred to as alkenyl phosphates, and in the present application these two terms are to be regarded as employed interchangeably.

A further object of the present invention is to prepare flameproofed articles by the use of alkene amido phosphates and their halogenated, particularly brominated, derivatives.

Another object is the flameproofing of inflammable materials, such as textiles and fibers, by the use of polymerized alkene amido phosphates which have been halogenated before or after polymerization.

Still another object of the invention is the use of polycondensing organic phosphates involving di- and tri-functional compounds as effective flameproofing agents.

When a polybromo triallyl phosphate is used, the process of preparing the flameproofing compounds consists substantially in polymerizing triallyl phosphate

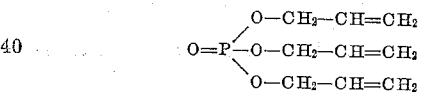

in a suitable solvent until the desired degree of polymerization is reached, brominating the polymer, and applying the solution to the cloth. The desired degree of polymerization will depend on several circumstances. In general, at least one of the original three double bonds will be left intact in the polymer in order to make possible the subsequent bromination by addition which is necessary for the flameproofing effect. In this case, the original bromine number of triallyl phosphate of about 220 would decrease to about 70. However, in some cases less bromine (down to bromine 30) will suffice to insure the desired flameproofing effect, while non-halogenated triallyl phosphate by itself will not provide an effective flameproofer. On the other hand, the lower limit of the bromine number may depend on the solubility of the polymer which decreases with decreasing bromine numbers. When triallyl phosphate is polymerized to completion, it will become saturated and incapable of adding halogen, and, even before that stage is reached, insoluble upon bromination. Also such an insoluble brominated product has been made useful by preparing from it a very fine powder and incorporating it into a resinous binder of a related type, for instance, into a binder of a lower or non-halogenated polyallyl phosphate.

Another factor determining the degree of polymerization and bromination is the desired degree of permanence against laundering and dry-cleaning. When a high degree of permanence is desired, the polymerization will be carried out as far as possible, with the limitations pointed out above.

A product with a relatively high degree of polymerization and relatively low bromine number which is still soluble can be obtained by fractionation of the polymerization product and removal of the low polymer and monomer. The higher polymer fraction gives a finish of excellent permanence.

There are in general two ways of preparing the polyhalo alkene and dialkene phosphates. One method consists in polymerizing the part-halogenated monomer, the other consists in halogenating the still unsaturated polymer.

We have been able to polymerize di-chloro triallyl phosphate and tetra-chloro triallyl phosphate, these compounds being the principal products formed when we added one or two moles of chlorine respectively to triallyl phosphate. The chlorinated products can be readily polymerized. We have found it advantageous to put the polymerizable compound on the cloth and completely polymerize thereon. They are not as efficient flameproofers as the brominated polymers. A distinct difference has thus been established between chlorine and bromine containing phosphates in favor of the latter as flameproofing compounds.

In preparing the bromine containing polymer, the monomer is first part-polymerized and then brominated. A major problem consists in carrying out the polymerization to the desired bromine number without causing gelation, and with maintaining solubility even after bromination.

The polymerization can be carried out by any of the known methods, i. e., in bulk, solution, emulsion, and pearl polymerization. The following examples illustrate some specific ways of preparing the flameproofing agents of our invention.

*Example I*

Polymerization in bulk and bromination in bulk:

1.25 parts of benzoyl peroxide are dissolved in 100 parts of triallyl phosphate. The mass is heated at 90° C. for 45 minutes. At this point the material is highly viscous but it has not gelled. The bromine number is 150. The partially polymerized mixture is soluble in ethylene dichloride or its homologs. A solution of bromine in ethylene dichloride (approximately 150 gms. of bromine in 150 grams of ethylene dichloride) is added. The excess bromine and acid products are removed by passing anhydrous ammonia through until the solution is neutral. Any salts formed are removed by filtration. Rayon (cellulose acetate) impregnated with 10–15 per cent, or cotton textile impregnated with 25 per cent, of the above solution is rendered flameproof. The finish will resist laundering and dry-cleaning, though not as well as in the following example.

*Example II*

Polymerization in bulk, removal of monomer by distillation, and bromination of the remaining polymer:

1.25 parts of benzoyl peroxide in 100 parts of triallyl phosphate are heated at 90° C. for 45 minutes. The bromine number of the ungelled material is 150. 1.25 parts of hydroquinone are added and the mixture vacuum distilled to remove monomer. The residue has a bromine number of 90. This polymer is dissolved in ethylene dichloride. A solution of bromine in ethylene dichloride is added to a slight excess as indicated by a permanent red color. The excess bromine and acid products are removed by neutralizing with anhydrous ammonia. Salts formed are removed by filtration.

Rayon (cellulose acetate) impregnated with 10–15 per cent, or cotton impregnated with 30 per cent of the above polymer are rendered flameproof. The finish remained flameproof after laundering and dry cleaning.

*Example III*

Polymerization in solvents, addition of ethylene dichloride and bromination:

20 parts triallyl phosphate are dissolved in 20 parts of carbon tetrachloride (or any other appropriate solvent, such as benzene, ethylene dichloride, or trichlorethylene), and 0.25 part of benzoyl peroxide is added as catalyst. After heating at reflux temperature for 65 minutes, 0.25 part of a suitable inhibitor, such as hydroquinone, is added to stop polymerization. At this point the overall bromine number is 150. The reaction solution is subjected to a vacuum distillation to remove solvent and monomer. 10 parts of the residue, a viscous polymer of bromine number 90, are dissolved in 50 parts of ethylene dichloride which is also an excellent solvent for the brominated polymer. To this solution are added 10 parts of bromine dissolved in 10 parts of ethylene dichloride. Addition is carried out slowly at 0–10° C. Anhydrous ammonia is then passed in until the solution is neutral or slightly alkaline. Any salts formed are filtered off and the solution is ready for treatment of the textile.

Textiles with a pick-up of 20–30 per cent were flameproof. We have found the finish to be resistant against dry-cleaning and laundering.

*Example IV*

Polymerization in solvent, addition of ethylene dichloride, and bromination without fractionation.

20 parts of triallyl phosphate are dissolved in 20 parts of a suitable solvent, i. e. carbon tetrachloride, and 0.25 part of benzoyl peroxide is added as catalyst. After refluxing for 65 minutes, the bromine number is approximately 150. Fifty parts of ethylene dichloride are added and the solution is brominated by slowly adding 30 parts of bromine at 0–10° C. The solution is neutralized with anhydrous ammonia, the salts are filtered off, and the solution is ready for use.

Rayon (cellulose acetate) with a pick-up of 10-15 per cent and cotton with a pick-up of 20-25 per cent are rendered flameproof. We have found this finish to resist laundering and dry-cleaning.

*Example V*

Polymerization in solution. Monomer and low molecular weight material removed by addition of a poor solvent for the polymer. Bromination of the polymer in solution:

100 parts of triallyl phosphate are dissolved in 100 parts of ethylene dichloride, and 1½ parts of benzoyl peroxide are added. The solution is refluxed for 60 minutes. 0.25 part of hydroquinone is added to stop polymerization, and the solution cooled to room temperature. Upon addition of 500 parts of carbon tetrachloride, a polymer mass separates. This polymer is redissolved in ethylene dichloride and reprecipitated to insure complete removal of monomer and very low molecular weight fractions. 50 parts of this polymer, bromine number 80, are dissolved in 50 parts of ethylene dichloride. (This is the preferred solvent; it is also an excellent solvent for the brominated polymer.) To this solution at 0°-10° C. bromine is slowly added; a permanent red color indicates the end-point. Anhydrous ammonia is passed in until the solution is neutral. Salts formed are filtered off. The brominated polymer is then precipitated with ethanol, and redissolved with ethylene dichloride.

To test the effect of the flameproofing treatment on the fabric, breaking strength tests have been run in conjunction with accelerated aging (heating and irradiation) tests as shown in the accompanying table. The results show: (1) the treatment increases somewhat the breaking strength (2) accelerated aging does not affect the treated material any more than the untreated material. The tests were run on cotton specimens with a 40 per cent pick-up and on Celanese (cellulose acetate) samples of about 15 per cent pick-up.

Cotton samples prepared as above passed the flameproofing tests as described in Navy Specification 51-T-13 after laundering according to Federal Specification CCC-T-191a.

Celanese (cellulose acetate) could be made flame-resistant in the sense of the Civil Aeronautics Administration (CAA) Specification of October 1, 1946 (compliance of aircraft materials with CAR-04 fire-prevention requirements, paragraph 3) with a pick-up of only 12 per cent. The increase of the tensile strength of the treated over untreated samples is shown in the table below.

| Type of Treatment | Breaking Strength [1] | | | | | |
|---|---|---|---|---|---|---|
| | Initial | | Heat Treated [2] | | Fadometer [3] | |
| | Warp | Fill | Warp | Fill | Warp | Fill |
| Untreated Cotton | 56 | 22 | 25 | 12 | Not Run [4] | |
| Cotton Treated As In Example V | 68 | 50 | 30 | 15 | Not Run [4] | |
| Untreated Celanese (Cellulose Acetate) | 88 | 70 | 85 | 65 | 80 | 65 |
| Celanese (Cellulose Acetate) Treated As In Example V | 90 | 70 | 85 | 65 | 80 | 65 |

[1] Measured by Scott tensilometer acc. to Navy Department Specification 51-T-13.
[2] Heat treatment at 110° C. for 24 hours.
[3] Fadometer—40 hours acc. Federal Specification CCC-T-191a.
[4] Untreated cotton fabric 4 ounces/square yard fails to withstand this test.

When carried out in organic solvents, e. g. in carbon tetrachloride, it might be necessary to change the solvent before or after bromination, since the brominated product may become insoluble in the original solvent. In general, among the effective solvents, are aromatic hydrocarbons, ketones, and chlorinated aliphatic hydrocarbons. However, the most effective solvent for the brominated polymer was ethylene dichloride. It may be assumed that solvents of the type of carbon tetrachloride as well as ketones influence the polymerization by participating in it with a free radical formation.

Triallyl phosphate has three potential functional groups in the three double bonds. Part of these as previously pointed out are saturated by polymerization; the remaining double bonds serve for the addition of halogen, in particular, bromine. It is desirable in our process to polymerize to a point where approximately two double bonds in each monomer unit are saturated by polymerization, while roughly one double bond remains to serve for the subsequent addition of bromine. It is obvious that the complete polymerization of the original monomer having three polymerizable double bonds should lead to a thermosetting insoluble resin which could not be kept in solution and supplied to the textile. However, by fractionating the polymer and removing the monomer, we succeeded in obtaining a polymer which was still thermoplastic in nature and soluble in certain solvents although the bromine number of the fractionated product was 90, i. e. fairly close to 70 which is the bromine number of polytriallyl phosphate in which just one double bond is left intact for subsequent bromination. Such a product is before, and even after, bromination soluble in ethylene dichloride and because of its high degree of polymerization (which is expressed by its low bromine number) provides an unusually high degree of permanence. Permanence is enhanced when the non-brominated polymer is reprecipitated, e. g. with cyclohexane, to give a higher polymer fraction which, in turn, after its bromination, is again precipitated from the ethylene dichloride solution by alcohol to remove any non-brominated polymer. Alcohol is an excellent solvent for the non-brominated, but not for the brominated polymer.

A polymerization product with a bromine number of 150, and still soluble in benzene, could be separated by vacuum distillation into a product consisting essentially of monomer and having a bromine number of 205, and a residue with a bromine number of 90. This fractionated polymer of bromine number 90 was no longer soluble in benzene, but was soluble in ethylene dichloride. It is conceivable that in this case a highly branched polymer is obtained, with sufficient solubility in ethylene dichloride to warrant application on the cloth.

Thus, while it was pointed out that a bromine number of 30 (corresponding to about 1 mole of bromine to every two moles of triallyl prosphate) was the lower limit for flameproofing effectiveness of the polymer, the most practical polymerization degree was found to correspond to a bromine number of 90 for the fractionated polymer and 150 for the unfractionated part-polymerized material.

The results were highly sensitive to the amount of catalyst used. There was a critical value of catalyst below which no gelatin took place. When triallyl phosphate was polymerized in ethylene dichloride, 1½ per cent benzoyl peroxide caused gelling in about one hour, while 1 per cent benzoyl peroxide caused no gelling even after long periods of time. The bromine number of 150 was obtained just before the product gelled.

During the polymerization, the viscosity increases with decreasing bromine number. The following describes a study of the polymerization of triallyl phosphate in solution with an appropriate solvent such as carbon tetrachloride, benzene, ethylene dichloride, or trichlorethylene. Benzoyl peroxide is used as the catalyst:

20 parts of triallyl phosphate, 1.25 parts of benzol peroxide and 20 parts of ethylene dichloride are heated at reflux in an oil bath at constant temperature of 110° C. Samples are withdrawn at 5 minute intervals up to the point of gelation. For this example, gelation occurs rapidly between 56 and 58 minutes. Upon taking samples, a suitable inhibitor, such as hydroquinone, is immediately added to retard further polymerization.

By determining the bromine number of each sample, a measure of the degree of residual unsaturation is given. Viscosity determinations are also of interest. The following table shows the variation of bromine number and viscosity with time:

TABLE I

| Time of Polymerization (Min.) | 0 | 5 | 10 | 15 | 20 | 25 | 30 | 35 | 40 | 45 | 50 | 55 |
|---|---|---|---|---|---|---|---|---|---|---|---|---|
| Residual Unsaturation [1] (Bromine Numbers) | 218 | 218 | 208 | 205 | 189 | 184 | 181 | 170 | 162 | 159 | 153 | 150 |
| Relative Viscosity at 25° C.[2] $\eta_p/\eta_m$ | 1.00 | 1.00 | 1.02 | 1.05 | 1.09 | 1.15 | 1.20 | 1.28 | 1.30 | 1.33 | 1.42 | 1.50 |

[1] Bromine taken up by the remaining double bonds expressed in weight per cents of triallyl phosphate, i. e. as bromine number.
[2] $\eta_p$—Efflux time of the polymer; $\eta_m$—efflux time of the monomer.

In carrying out the polymerization in a water emulsion, we have observed an interesting phenomenon. In bulk and in solution, the polymerization can be led, if desired, to completion, i. e. until no double bonds remain; this is not necessarily the case with the emulsion polymerization. In solution, we stop polymerization at the desired point by the addition of an inhibitor in order to insure sufficient residual unsaturation for the subsequent bromination. In emulsion, however, the polymerization never went further than two-thirds of the way no matter how long and under what conditions the polymerization was carried out. This polymerization degree is just about right to attain the desired degree of bromination.

The emulsion polymerization can be carried out so that, after bromination, a latex is obtained which can be put on the cloth like any conventional water-type finish. Other modes of carrying out the process consists in breaking the emulsion and then brominating, or brominating the latex directly and having the bromination break the emulsion. In these latter two cases, a powder is obtained which can be finely dispersed, by means of a colloid mill, in any conventional binder, preferably of a chemically related type (polytriallyl phosphate, polychloro triallyl phosphate). In this case also any other suitable binder, e. g. a vinylite binder, can be used in an organic solvent or in a water dispersion. While such a composition with a separate binder will not show the advantages of the self-binding flameproofers as discussed above, they will be useful as pigments for flameproofing paints on various flammable materials, such as wood, and for the manufacture of flame-resistant laminates.

*Example VI*

Emulsion polymerization and bromination in emulsion without breaking the emulsion:

Triallyl phosphate is polymerized in emulsion at 95° C. with vigorous stirring.

Polyvinyl alcohol is the emulsifying agent. Calcium carbonate is present to maintain the desired pH. Parts by weight follow:

| | Parts |
|---|---|
| Triallyl phosphate | 218 |
| Polyvinyl alcohol | 21.8 |
| Calcium carbonate | 21.8 |
| Benzoyl peroxide | 4.36 |
| Water | 3924 |

The desired degree of polymerization is reached in 105 minutes.

The emulsion is cooled to 20° C. and 320 parts of a solution of equal parts of bromine and benzene are added with vigorous agitation.

During the bromination, the viscosity increases and water is added.

The finished emulsion is stable and can be directly applied to the textile. Textiles having a 30 per cent pick-up and then dried at 100–110° C. are rendered flameproof.

*Example VII*

Formation of an insoluble polymer and bromination thereof to form a flameproofing powder:

An emulsion is prepared by adding slowly under very vigorous agitation 10 parts of triallyl phosphate (containing 2 per cent benzoyl peroxide dissolved therein) to 1 part of poylvinyl alcohol, 18 parts of water, and 1 part of calcium carbonate. The emulsion is heated under reflux at 95° C. with good stirring for a period of 2 hours. At this point, the emulsion thickens appreciably, and an additional 18 parts of water are added to form a slurry which is then heated for one more hour.

The slurry is filtered while still hot, and the powder is washed first with hot water to remove polyvinyl alcohol, then with benzene to remove any residual monomer, and finally dried at 90° C. to yield approximately 85 per cent of a white insoluble polymer which at this stage has about one-third of its unsaturation left intact. The powder is then passed through a micro pulverizer. 10 parts of the finely ground powder are suspended in 50 parts of carbon tetrachloride and an excess of bromine added with stirring under reflux. The powder is filtered off and washed with dilute acid to remove calcium carbonate. Following this, dilute sodium carbonate is added to remove residual free bromine and acid products; and after washing thoroughly with water, the powder is dried at 100–110° C. and reground.

For flameproofing textiles, a suspension of this powder is prepared by adding 70 parts powder under vigorous stirring to a solution of 30 parts of Vinylite, e. g. a vinyl chloride-vinyl acetate copolymer containing about 80 per cent vinyl chloride, in 400 parts of methyl ethyl acetone. The suspension is then run through a colloid mill.

Cotton is impregnated with this suspension and dried at 110–120° C. 40 per cent pick-up of this mixture provides a flameproof finish which is laundry and dry-clean resistant.

Example VIII

Bromination in emulsion to form flameproofing powder:

An alternative method for preparing the flameproof powder described in the previous example consists in partially polymerizing a dilute emulsion containing approximately 25 per cent total solids. This emulsion is prepared as in the preceding example and contains the following proportions:

| | Parts |
|---|---|
| Triallyl phosphate | 10 |
| Polyvinyl alcohol | 1 |
| Benzoyl peroxide | 0.2 |
| Calcium carbonate | 1 |
| Water | 60 |

The emulsion is heated with vigorous stirring under reflux at 95° C. for 180 minutes whereupon 0.2 part hydroquinone is added to stop the polymerization at a stage where the polymer has one-third of its original unsaturation remaining. 10 parts of elementary bromine constituting about a 20 per cent excess are then dropped into the emulsion at a temperature of 10° C.; and when two-thirds of the bromine have been added, the emulsion breaks with separation of a brominated powder. After all the bromine has been added, the brominated powder is separated and purified exactly as in the preceding example to yield an insoluble flameproof polymer in powder form.

For treating cotton textiles this powder is used in Vinylite suspension and provides a flameproof finish to the textiles which resists boiling in water for 2 hours and boiling in 0.5 per cent soap—0.2 per cent sodium carbonate for 40 minutes.

Solution polymerization can lead to a thermoplastic resin as described previously. Emulsion polymerization leads to a thermosetting type polymer; and the latex prepared in this way is unusual in having a thermosetting powder as the dispersed phase. A resin powder prepared from a solvent type polymer, e. g. by precipitation from the solution with a non-solvent, can be made to flow together on the textile by application of heat, or heat and pressure. This is not the case with the resin powder prepared from the emulsion.

Where the need for permanency is not of the utmost importance, we have found that the brominated monomers are exceptionally good flameproofing agents. The following examples illustrate the preparation and use of some of the brominated derivatives of triallyl phosphate.

Example VIII-A

Triallyl phosphate completely brominated in solution.

218 parts of triallyl phosphate are dissolved in 654 parts of benzene. 480 parts of bromine in 480 parts of benzene are slowly added at approximately 25° C. with stirring. When the addition is completed, anhydrous ammonia is passed through to remove excess bromine and to neutralize the solution. Precipitated salts are filtered off. The solution is further diluted in order to give a concentration that will provide the desired pick-up on the cloth, i. e. 10–30 per cent, dependent on the type of textile.

Cotton and acetate rayon impregnated with this solution are rendered flameproof.

Example VIII-B

Triallyl phosphate partially brominated in solution.

218 parts of triallyl phosphate are dissolved in 2180 parts of benzene; 160 parts of bromine in 1600 parts of benzene are slowly added with vigorous stirring and at room temperature. When the addition is completed, anhydrous ammonia is passed through to neutralize any acid products. If any salts are precipitated, they are filtered off.

The solution is concentrated to the desired degree.

Textiles impregnated with this solution are rendered flameproof and show some permanence in dry-cleaning.

The amount of bromine added is equivalent to the formation of a dibromo triallyl phosphate. Although the bromine content is lower than above, the total pick-up for flameproofness does not materially change.

Example VIII-C

Triallyl phosphate brominated in emulsion:

An emulsion of 50 parts of triallyl phosphate in a solution of 5 parts of polyvinyl alcohol and 100 parts of water is prepared by the slow addition of the triallyl phosphate to the polyvinyl alcohol solution with vigorous stirring. 5 parts of calcium carbonate are added to keep the pH constant during bromination. The emulsion may be stabilized by running through a colloid mill.

110 parts of bromine in 50 parts of benzene are added slowly with good agitation at 20° C. The emulsion is ready for use and may be directly applied to the textile.

Example VIII-D

Triallyl phosphate partially brominated in emulsion:

50 parts of triallyl phosphate are emulsified with 5 parts of polyvinyl alcohol and 200 parts of water.

37 parts of bromine in 100 parts of benzene are dropped in slowly with vigorous agitation at a temperature of 20° C. This amount of bromine is equivalent to the formation of a dibromo-triallyl phosphate.

Example VIII-E

Incorporation of brominated triallyl phosphate in a Vinylite binder:

To 218 parts of triallyl phosphate dissolved in 218 parts of benzene are added 480 parts of bromine in 480 parts of benzene. The addition is made at room temperature. When the reaction is completed, anhydrous ammonia is passed through to remove excess bromine and acid materials. If salts separate, they are filtered off. The benzene is removed under vacuum. The remaining thick viscous oil in a hexabromo triallyl phosphate.

30 parts of this material are dissolved in 400 parts of methyl ethyl ketone to which are added 70 parts of Vinylite, such as, a vinyl chloride-vinyl acetate copolymer containing about 80 per cent vinyl chloride.

The textile to be flameproofed is impregnated with this solution and dried. The resulting finish is flameproof.

Cotton so treated has resisted boiling in 1 per cent soap solution for at least 30 minutes. The finish is also dry-clean-proof.

Example VIII-F

Incorporation of brominated triallyl phosphate as a flameproofing plasticizer in a Vinylite film:

21.8 parts of hexabromo triallyl phosphate prepared by completely brominating triallyl phosphate are dissolved in a solution of 73 parts of Vinylite, such as a vinyl chloride-vinyl acetate copolymer containing about 80 percent vinyl chloride, in 365 parts of methyl ethyl ketone.

Films prepared from this solution by evaporating the solvent are transparent, colorless, tough, and flameproof, the hexabromo triallyl phosphate acting both as a plasticizer and flameproofer.

This method of plasticizing and flameproofing at the same time may be applied to other vinyl type materials and to organic cellulose derivatives.

Example VIII-G

The preparation of tetrabromo diallyl ammonium phosphate and its use as a flameproofer:

46 parts of sodium metal are dissolved in 232 parts of allyl alcohol and 232 parts of toluene. At 0° C. 153.5 parts of phosphorus oxychloride are slowly added with stirring. When the addition is completed, the temperature is kept at 10° C. for an additional hour. A good yield of diallyl phosphoric acid is obtained. Sodium chloride is filtered off and the solution concentrated. Anhydrous ammonia is passed in and the diallyl ammonium phosphate precipitates. 178 parts of the ammonium salt are dissolved in water and 320 parts of bromine are added with vigorous stirring at 10° C. to form the tetrabromo diallyl ammonium phosphate. This compound is useful whenever water solubility is desired. It is an excellent flameproofing agent and imparts a fine "hand" to treated textiles.

We have found that apart from bromination and chlorination, a third method of modifying polyalkene phosphates in a manner suitable for the preparation of flameproofing compounds is possible.

When sulfuryl chloride is added to certain unsaturated compounds, the compound becomes saturated by the addition of chlorine. Sulfuryl chloride seems to offer an interesting means of chlorinating unsaturated compounds. It is not quite clear as yet whether sulfur as well as chlorine takes some part in the reaction. An indication to that effect lies in the fact that when reacted with alkene phosphates or polyalkene phosphates respectively, sulfuryl chloride gives a much better flameproofing agent than does chlorine gas.

At room temperatures, sulfuryl chloride acted as a chlorinating agent on triallyl phosphate; however, at low temperature, e. g. −30° C., sulfuryl chloride in moderate concentration appears to act as a polymerization catalyst.

Instead of triallyl phosphate, other trialkene phosphates, e. g. trimethallyl phosphate and dialkene phosphates can be successfully used.

The preparation of the dialkene amido phosphates is described in the copending application of George E. Walter, Irwin Hornstein, and George M. Steinberg, Serial No. 62,234, filed November 26, 1948. Compounds of this type are those included in the following formula:

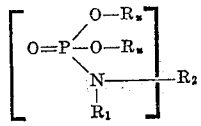

where $R_u$ represents an unsaturated aliphatic radical having from 3 to 5 carbon atoms; $R_1$ is selected from the class consisting of hydrogen, an alkyl radical having from 1 to 3 carbon atoms, an hydroxyalkyl radical having from 1 to 3 carbon atoms, and an unsaturated aliphatic radical having from 3 to 5 carbon atoms; and $R_2$ is selected from the class consisting of hydrogen, an unsaturated aliphatic radical having from 3 to 5 carbon atoms, and X, where X represents

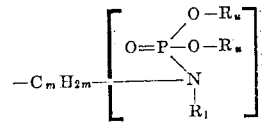

in which $m$ is a small whole integer and $R_1$ and $R_u$ have the same meanings as before.

In cases where the need for permanency is not of the utmost importance, we have found that the halogenated, particularly brominated, monomers are unexcelled flameproofing agents. In addition, the unbrominated monomers alone impart a considerable degree of flameproofness, and monoamido dialkyl phosphates in which the alkyl group contains less than five carbon atoms can be used as flameprofing agents for cellulose and cellulose derivatives. Curiously enough, polymers prepared from these monomers are not suitable for flameproofing without the addition of bromine.

The following examples illustrate the preparation and the use of various of these compounds as flameproofing agents:

Example IX

Tetra bromo diallyl phosphonamide:

To 177 parts of diallyl phosphonamide dissolved in 500 parts of a mixture of 70 per cent carbon tetrachloride-30 per cent isopropanol are added drop-wise and at room temperature 320 parts of elementary bromine. When the addition is complete, the solution is neutralized by adding a few drops of concentrated ammonium hydroxide. Cellulose acetate and cotton fabrics impregnated with this solution are when first dried somewhat tacky, but further heating improves the "hand" very appreciably.

The dry pick-up necessary to flameproof cotton is no more than 10 to 12 per cent. Cellulose acetate requires 20 to 25 per cent. Textiles so treated can withstand leaching in cold water overnight.

Example X

Tetra bromo N-methylol diallyl phosphonamide:

To 207 parts of N-methylol diallyl phosphonamide dissolved in 500 parts of a mixture of 70 per cent ethylene dichloride-30 per cent isopropanol are added drop-wise at room temperature 320 parts of elementary bromine. When the addition is complete, the solution is allowed to stand for 15 minutes and then neutralized by adding a few drops of concentrated ammonium hydroxide.

Cellulose acetate and cotton fabrics impregnated with this solution when first dried at 100° C. for 2 to 3 minutes are quite tacky. However, further heating for 15 to 20 minutes at 120° C. changes the "hand" completely. The fabrics so treated have a finish difficult to distinguish from the original "hand."

Cotton twill can be flameproofed with as low as 10 per cent dry pick-up. Twill with a 20 per cent pick-up can be boiled in water for at least two hours with no loss in flameproofness and can withstand several severe launderings (in neutral soap) and dry-cleanings.

Cellulose acetate with a 25 to 28 per cent pick-up is rendered flameproof. In addition "dripping" on burning which is characteristic of cellulose acetate fabrics is eliminated. It should be noted that almost all of the compounds described in this invention will do away with "dripping."

The flameproof finish is not removed even by successive dry-cleanings.

*Example XI*

Octabromo N-N' methylene bis diallyl phosphonamide:

To 366 parts of N-N' methylene bis diallyl phosphonamide dissolved in 1000 parts of a mixture of 70 per cent ethylene dichloride-30 per cent iso-propanol are added drop-wise and at room temperature 640 parts of elementary bromine. When the addition is complete, a few drops of concentrated ammonium hydroxide are added to neutralize the solution.

The solution is diluted to the desired concentration by adding as much of the 70-30 ethylene dichloride-isopropanol mixture as may be necessary.

Cellulose acetate and cotton fabrics impregnated with this solution when first dried at 100° C. for 2 to 3 minutes are quite tacky. Further heating at 120° C. for 15 to 20 minutes improves the "hand" materially. This material imparts a somewhat stiffer "hand" to Celanese (cellulose acetate) than the tetrabromo N-methylol diallyl phosphonamide. In addition, it is, however, dry-clean resistant. Cellulose acetate fabrics with a 25 to 30 per cent pick-up are completely flameproof and can withstand several dry-cleanings.

Cotton fabrics are flameproof with a 10 to 15 per cent pick-up and can resist several launderings in neutral soap solutions.

*Example XII*

Hexabromo N-allyl diallyl phosphonamide:

To 217 parts of N-allyl diallyl phosphonamide dissolved in 500 parts of a mixture of 70 per cent carbon tetrachloride and 30 per cent isopropanol are added slowly at room temperature 480 parts of elementary bromine. When the addition is complete, the solution is neutralized by adding a few drops of concentrated ammonium hydroxide.

Cellulose acetate and cotton fabrics impregnated with appropriately diluted solutions are effectively flameproofed and can withstand some laundering, dry-cleaning, and leaching.

*Example XIII*

Octabromo N-diallyl diallyl phosphonamide:

To 257 parts of N-diallyl diallyl phosphonamide in 1000 ml. of a 70 per cent carbon tetrachloride-30 per cent isopropanol solution are added slowly and at room temperature 640 parts of bromine. When addition is complete, the solution is neutralized by the addition of a few drops of concentrated ammonium hydroxide.

When appropriately diluted, cellulose acetate and cotton fabrics can be effectively flameproofed with pick-ups of 25 per cent and 10 per cent respectively.

*Example XIV*

Polymerization of diallyl phosphonamide in solution-fractionation of high polymer fraction-subsequent halogenation:

Polymerizations in bulk are more difficult to control than in solution. In this work we have found that solution polymerization gives more consistent results and uniform products.

100 parts of diallyl phosphonamide are dissolved in 100 parts of isopropanol, and 2 parts of benzoyl peroxide are added as a catalyst. The polymerization is carried out at 90° C. for 90 minutes. The higher polymers are precipitated with cyclohexane, naphtha, or carbon tetrachloride, and then redissolved in a slight amount of methanol and reprecipitated with carbon tetrachloride.

The high polymer fraction is dissolved in a mixture of ethylene dichloride and methanol, and elementary bromine is added slowly at room temperature until a permanent red color remains. Anhydrous ammonia is passed in until the solution is neutral. The polymer is reprecipitated with naphtha and redissolved in the 70-30 mixture of ethylene dichloride-methanol.

Cotton textiles impregnated with this solution, dried, then thoroughly rinsed and having a residual pick-up of 15 per cent are rendered completely flameproof. Textiles so treated are flameproof even after boiling in a neutral 1 per cent soap solution for 3 hours. The flameproof effect is retained after numerous launderings and dry-cleanings.

*Example XV*

Polymerization of N-methylol diallyl phosphonamide in solution with subsequent halogenation:

To 100 parts of N-methylol diallyl phosphonamide in 100 parts of isopropanol add 2 parts of benzoyl peroxide. Polymerization is carried out at 100° C. under reflux. After 2 hours (prior to point of gelation), the high polymer fraction is precipitated with cyclohexane, naphtha, or carbon tetrachloride. The precipitate is redissolved in a minimum of methanol and reprecipitated with carbon tetrachloride.

Halogenation is carried out at or below 20° C. 100 parts of the polymer are dissolved in 1 liter of 70 per cent ethylene dichloride-30 per cent methanol mixture. Elementary bromine or chlorine is added drop-wise until a red or yellow-green coloration persists. The solution is neutralized with anhydrous ammonia. The polymer is reprecipitated with naphtha then redissolved in the 70-30 mixture of ethylene dichloride-methanol.

The polymer thus obtained may prove useful as a plasticizer, coating, or plastic, and will add the inherent advantage of flameproofness.

Cotton textiles impregnated with this solution, dried, thoroughly rinsed and having a residual pick-up of approximately 15 per cent are rendered completely flameproof. Textiles so treated can withstand boiling for several hours in neutral 1 per cent soap solutions without any loss in flameproofness and can withstand numerous launderings and dry-cleanings.

*Example XVI*

Polymerization of N-N' methylene bis amido diallyl phosphate in solution with subsequent halogenation:

To 100 parts of N-N' methylene bis amido diallyl phosphate in 100 parts of isopropanol add 2 parts of benzoyl peroxide. Polymerization is carried out at a bath temperature of 100° C. under reflux. After 2 hours, i. e. the point just prior to gelation, the high polymer fraction is precipitated with cyclohexane, naphtha, or carbon tetrachloride. The precipitate is redissolved in a minimum of methanol and reprecipitated with carbon tetrachloride.

If desired, this polymer can be halogenated by the process described in the preceding example.

The monomer molecule is complex and contains four active double bonds. Polymers obtained from this monomer are more highly branched and have a greater halogen content. The physical properties of these polymers, therefore, differ from those obtained from simpler monomers and may prove more useful in some instances. Films produced from this polymer are less thermoplastic and have higher softening points than polymers obtained from diallyl phosphonamide and N-methylol diallyl phosphonamide.

Textiles impregnated with the above solution, dried, and then rinsed thoroughly, having a residual pick-up of approximately 15–20 per cent, are rendered completely flameproof. Textiles so treated can withstand several hours of boiling in 1 per cent soap solution and numerous launderings and dry-cleanings without losing their flameproofness.

*Example XVII*

Polymerization of N-N' ethylene bis amido diallyl phosphate in solution, with subsequent halogenation:

To 100 parts of N-N' ethylene bis amido diallyl phosphate in 100 parts of isopropanol add 2 parts of benzoyl peroxide. Polymerization is carried out at a bath temperature of 100° C. and under reflux. After 2 hours, just prior to gelation, the high polymer fraction is precipitated with either cyclohexane, naphtha, or acetone. The precipitate is redissolved in a minimum of methanol and reprecipitated with carbon tetrachloride. 100 parts of the polymer fraction are dissolved in 1 liter of a 70 per cent ethylene dichloride-30 per cent methanol mixture. Elementary bromine or chlorine is added slowly until the red or yellow-green coloration persists. The solution is neutralized with anhydrous ammonia and the high polymer fraction reprecipitated with carbon tetrachloride.

Textiles, in particular cotton, are rendered flamproof by this material. This polymer, in addition to having the advantages of a higher softening point because of the complexity of the monomer molecule, i. e. four double bonds, has been found to be alkali resistant. Substituting an alkyl group of at least 2 carbon atoms for one of the hydrogen atoms on the amido group increases alkali resistance immensely. Thus, textiles boiled with 1 per cent soap solution containing ¼ per cent sodium carbonate impregnated with polymers obtained from the diallyl phosphonamide and N-N' methylene bis diallyl amido phosphate monomers lose their flameproofness in a rather short time, while polymers prepared from N-N' ethylene bis diallyl amido phosphate, or from monomers prepared by reacting diallyl phosphite with polyamines, such as diethylene triamine, triethylene tetramine, tetraethylene pentamine, etc., in the presence of carbon tetrachloride, show this property of increased alkali resistance.

Textiles impregnated with a solution of the polymer as prepared in this example, dried, and then thoroughly rinsed, having a residual pick-up of 15 to 20 per cent are rendered completely flameproof. Textiles so treated can withstand several hours of boiling in a 1 per cent soap solution containing ¼ per cent of sodium carbonate and numerous launderings and dry-cleanings without any loss in flameproofness.

By similar methods of polymerization and fractionation followed by subsequent halogenation, halogenated derivatives of such polymers may be prepared from N-allyl, diallyl phosphonamide, N-diallyl, diallyl phosphonamide, and dipropargyl phosphonamide. Textile fabrics treated with these polymers and having a residual pick-up of 15 to 20 per cent are rendered completely flameproof.

It should be noted that in the case of the more complex and/or more highly unsaturated molecules, such as those containing four double bonds, or such as dipropargyl phosphonamide, that the compound may be first halogenated and then polymerized. With simpler molecules, as, for example, diallyl phosphonamide, prior halogenation of one of the double bonds so reduces the activity of the molecule as to prevent subsequent polymerization.

Similarly, complex monomer molecules, such at N-N' methylene bis amido diallyl phosphate, and particularly N-N' ethylene bis amido diallyl phosphate, which contain four active double bonds result in more highly branched polymers. When these polymers are halogenated, there is considerable halogen present and films produced from these polymers are much less thermoplastic and have higher softening points than polymers produced from the simpler monomer molecules. Further, substituting an alkyl group of at least two carbon atoms for one of the hydrogen atoms on the amido group increases alkali resistance immensely, making compounds so produced particularly effective and permanent flameproofing agents for textiles.

Another way of carrying out the invention is to use polycondensing organic phosphates having two or three functional groups. Thus, we have prepared a polycondensing flameproofing compound by reacting one mole of dibromo-propyl-dichloro-phosphate with one mole of ethylene glycol. The resulting compound which is a poly-dibromo-propyl-diethylene-phosphate is a highly viscous resin, which when applied on textiles provides an effective flameproofing finish.

*Example XVIII*

Preparation of a flameproof polycondensation polymer:

To 153.5 parts of phosphorus oxychloride in 420 parts of toluene are added 218 parts of dibromopropanol at a temperature of −30° C. At this temperature no reaction seems to occur until a base is added. 80 parts of pyridine are added, the temperature being raised to −10° C. At this point we have a product of this type

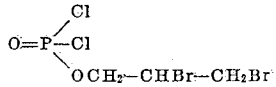

With vigorous stirring at −10° C., a mixture of 62 parts of ethylene glycol in 160 parts of pyridine is added. At completion of the addition, the temperature is raised to 0° C. and kept there for two hours. With the temperature still at 0° C., 500 parts of water are added with stirring to dissolve out any untreated ethylene glycol, salts, etc. A heavy insoluble oil separates out.

The oil is separated and washed with dilute alkali and water to remove any acid products. The oil is vacuum distilled to remove low boiling fractions.

The residue is a clear very viscous oil soluble in acetone.

When applied to cotton with a 25 per cent pick-up, the resulting fabric is rendered flameproof and will resist leaching by water.

Still another way of carrying out the invention consists in the polycondensation of completely, or partly, halogenated, preferably brominated, organic phosphates in the presence of metals, such as zinc or sodium. In this way, hexabromo triallyl phosphate can be converted into a viscous polycondensation product when a suspension of zinc powder in the benzene solution of the monomer is refluxed for several hours. This product gives an effective flameproofing finish to cotton and rayon (cellulose acetate). It is obvious that the product just described is related to the polyhalo-alkene phosphates derived by addition polymerization and by polycondensation. The following example illustrates the above process.

*Example XIX*

The use of zinc powder to prepare a polycondensed polymer from hexabromo triallyl phosphate:

Hexabromo triallyl phosphate is prepared by adding 480 parts of bromine in 480 parts of benzene to 218 parts of triallyl phosphate. The addition is done slowly with stirring at 25° C. Anhydrous ammonia is passed through to remove excess bromine and to neutralize the solution. Precipitated salts are filtered off. The solution is further diluted with 218 parts of benzene.

To this solution were added 100 parts of zinc powder. The benzene solution was refluxed for 5 hours, the zinc being kept in suspension by vigorous stirring. At the end of this time considerable zinc bromide had formed. The solution was filtered to remove zinc salts and zinc. The benzene was distilled off leaving a highly viscous oil. This material was dissolved in ethylene dichloride and diluted to give a 25 to 35 per cent polymer. Pick-up on cotton proved to be an efficient flameproofer. A pick-up of 10 to 15 per cent was sufficient to render rayon (cellulose acetate) flameproof.

Instead of polymerizing and halogenating the various monomers prior to their application on the inflammable material, they can be, when desired, polymerized and/or halogenated directly on the material to the flameproofed, as described and claimed in our co-pending application Serial No. 62,235, filed November 26, 1948.

In this way, triallyl phosphate can be brought on the cloth and polymerized there in the presence of a catalyst, preferably in a nitrogen atmosphere, until a bromine number of about 70 is reached, whereupon the finish is brominated directly on the cloth. Such a polymer finish is, in contrast to the prepolymerized product with a bromine number of 90 as described above, actually crosslinked and the thermosetting in nature. These finishes are highly permanent to laundering and dry-cleaning, and have no adverse effect on the feel of the textile.

Apart from the favorable effect of the polymerization on the textile, the halogenation on the cloth has by itself a surprisingly favorable effect which is as yet not completely understood. This is shown by the superior permanence of a polymer fraction of bromine number 90 which was brominated on the cloth, when compared with the same fraction brominated in solution, prior to application.

Dichloro-triallyl phosphate can be polymerized directly on the cloth to give a thermosetting type polymer which, however, as indicated before is much less effective than the brominated polymer and is a flame-retardant rather than a flameproofer.

Again, the above-mentioned diallyl phosphonamide can be polymerized and subsequently brominated on the cloth.

Fluorination is included in our process. In general, we have found it expedient to introduce halogen into our polymer by addition; however, halogenation by substitution is included in our process.

The monomers and polymers as described above can be applied on wood and other inflammable material, either by impregnating that material throughout or by coating its surface.

However, the invention is not limited to the flameproofing field, many of the polymers described herein can be used successfully in other fields, and the flameproofing effect will be an additional advantage. Thus, the polymers can be used as plasticizers for other resins. For instance, vinylchloride-acetate copolymers or cellulose acetate can be successfully plasticized and flameproofed at the same time. Flameproof films can be produced.

The flameproofing compounds can also be added directly to cellulose acetate, or cellulose xanthogenate or other materials from which fibers are spun or films cast.

This process can also be carried out by copolymerizing halogenated alkene phosphates with a non-halogenated monomer of the same type or with a halogenated or non-halogenated monomer of another type. Thus, we could copolymerize triallyl phosphate with its bromo compound by introducing approximately ⅛ of a mole of bromine into triallyl phosphate and subsequently polymerizing.

It is to be noted that the pick-up of flameproofing substance on the textile is a function of the nature of the fabric, the type of weave, and the weight of the cloth per square yard. To make acetate rayon just flame-retardent according to CAA (Civil Aeronautics Administration) Regulation of October 1, 1946, a pick-up of about 10 per cent will be sufficient, while about twice as much is needed for absolute flameproofness. Cotton of 8 ounces per square yard required about 20 per cent pick-up to satisfy the flame-resistance test according to the Navy Department Specification 51T13, and the laundering and dry-cleaning tests according to Federal Specification CCC-T-191a. For a large number of laundering cycles, or for lighter weight cotton, a somewhat higher pick-up (25 or 30 per cent) will be preferable to be on the safe side so that quite generally the pick-up will vary from 10 to 40 per cent.

This application is a continuation-in-part of the copending application of George E. Walter, Irwin Hornstein, and Clarence A. Sheld, entitled "Flameproofing Polmers and Polymerizing Compounds," Serial Number 761,146, filed July 15, 1947.

It is to be understood that certain changes, alterations, modifications, and substitutions can be made without departing from the spirit and scope of the appended claims.

We claim as our invention:

1. A process for flameproofing inflammable materials comprising impregnating the material to be flameproofed with an after-halogenated partial polymerization product of an alkenyl phosphate having at least two alkenyl radicals of from 3 to 5 carbon atoms, the halogen atoms that are present being selected from the class consisting of bromine and chlorine atoms.

2. A process for flameproofing inflammable materials comprising impregnating the material to be flameproofed with an after-brominated partial polymerization product of a trialkenyl phosphate wherein the alkenyl radicals have from 3 to 5 carbon atoms.

3. A process for flameproofing inflammable materials comprising impregnating the material to be flameproofed with an after-brominated partial polymerization product of triallyl phosphate.

4. A normally inflammable material that has been flameproofed by impregnation with an after-halogenated partial polymerization product of an alkenyl phosphate having at least two alkenyl radicals of from 3 to 5 carbon atoms, the halogen atoms that are present being selected from the class consisting of bromine and chlorine atoms.

5. A normally inflammable material that has been flameproofed by impregnation with an after-brominated partial polymerization product of triallyl phosphate.

6. A normally inflammable material that has been flameproofed by impregnation with an after-brominated partial polymerization product of a trialkenyl phosphate wherein the alkenyl radicals have from 3 to 5 carbon atoms.

GEORGE E. WALTER.
IRWIN HORNSTEIN.
CLARENCE A. SHELD.

References Cited in the file of this patent

UNITED STATES PATENTS

| Number | Name | Date |
|---|---|---|
| 2,273,891 | Pollack et al. | Feb. 24, 1942 |
| 2,318,959 | Muskat et al. | May 11, 1943 |
| 2,332,461 | Muskat et al. | Oct. 19, 1943 |
| 2,332,900 | D'Alelio | Oct. 26, 1943 |

FOREIGN PATENTS

| Number | Country | Date |
|---|---|---|
| 498,832 | Great Britain | Jan. 13, 1939 |

OTHER REFERENCES

Paint, Oil and Chemical Review, August 8, 1946, page 40.